United States Patent
Abdallah et al.

(10) Patent No.: US 9,261,076 B2
(45) Date of Patent: Feb. 16, 2016

(54) METHOD FOR OPERATING A WIND TURBINE AT IMPROVED POWER OUTPUT

(75) Inventors: Imad Abdallah, Arhus (DK); Erik Carl Lehnskov Miranda, Randers SV (DK); Ali Zaib, Aalborg (DK)

(73) Assignee: Vestas Wind Systems A/S, Aarhus N. (DK)

(*) Notice: Subject to any disclaimer, the term of this patent is extended or adjusted under 35 U.S.C. 154(b) by 118 days.

(21) Appl. No.: 13/701,259

(22) PCT Filed: May 31, 2011

(86) PCT No.: PCT/DK2011/050183
§ 371 (c)(1),
(2), (4) Date: Feb. 11, 2013

(87) PCT Pub. No.: WO2011/150931
PCT Pub. Date: Dec. 8, 2011

(65) Prior Publication Data
US 2013/0140819 A1 Jun. 6, 2013

Related U.S. Application Data

(60) Provisional application No. 61/350,581, filed on Jun. 2, 2010.

(30) Foreign Application Priority Data

Jun. 2, 2010 (DK) .................................. 2010 70236

(51) Int. Cl.
*F03D 7/02* (2006.01)
*F03D 7/04* (2006.01)

(52) U.S. Cl.
CPC ................ *F03D 7/02* (2013.01); *F03D 7/0224* (2013.01); *F03D 7/046* (2013.01); *F05B 2270/20* (2013.01); *F05B 2270/328* (2013.01); *F05B 2270/336* (2013.01); *Y02E 10/723* (2013.01)

(58) Field of Classification Search
CPC ......... F03D 7/0224; F03D 7/046; F03D 7/02; F05B 2270/328
USPC ..................................................... 290/44, 55
See application file for complete search history.

(56) References Cited

U.S. PATENT DOCUMENTS

| 4,339,666 A | 7/1982 | Patrick et al. |
| 6,619,918 B1 * | 9/2003 | Rebsdorf .......................... 416/1 |
| 2008/0001409 A1 | 1/2008 | Schellings |
| 2009/0295159 A1 | 12/2009 | Johnson et al. |
| 2010/0040468 A1 | 2/2010 | Andersen et al. |

FOREIGN PATENT DOCUMENTS

| WO | WO 2008131776 A2 * 11/2008 |
| WO | 2010057737 A2  5/2010 |

OTHER PUBLICATIONS

Danish Patent and Trademark Office, Examination and Search Report issued in corresponding DK Application No. PA 2010 70236 dated Dec. 16, 2010, 4 pages.
International Searching Authority, Search Report and Written Opinion issued in corresponding PCT/DK2011/050183 dated Feb. 14, 2012, 10 pages.
International Bureau, International Preliminary Report on Patentability issued in corresponding PCT/DK2011/050183 dated Dec. 4, 2012, 6 pages.

* cited by examiner

*Primary Examiner* — Tulsidas C Patel
*Assistant Examiner* — Viet Nguyen
(74) *Attorney, Agent, or Firm* — Wood, Herron & Evans, LLP (57) ABSTRACT

A method for operating a wind turbine includes: providing a curve defining optimal pitch angle as a function of tip speed ratio or as a function of wind speed; modifying at least a part of the optimal pitch angle curve by applying a safety buffer, thereby obtaining a safety modified pitch angle curve; operating the wind turbine in accordance with the safety modified pitch angle curve; measuring one or more parameters regarding wind conditions and/or loads on one or more component of the wind turbine; adjusting the safety buffer, based on the measurements, thereby obtaining an adjusted pitch angle curve; and operating the wind turbine in accordance with the adjusted pitch angle curve. Since the safety buffer is adjusted based on measured parameters, it can be reduced if actual operating conditions are less severe than expected. This allows the wind turbine to be operated in a more optimal manner.

8 Claims, 4 Drawing Sheets

Prior Art

Fig. 1

Prior Art

METHOD FOR OPERATING A WIND TURBINE AT IMPROVED POWER OUTPUT

FIELD OF THE INVENTION

The present invention relates to a method for operating a wind turbine, in particular a pitch regulated wind turbine. More particularly, the method of the present invention provides an improved annual energy production of the turbine while reducing the risk of rotor blade stall, and reducing the risk of damage to the wind turbine.

BACKGROUND OF THE INVENTION

When operating a pitch controlled wind turbine, the pitch angle of the blades is controlled in order to maximise the rotor power coefficient, $C_P$, without exceeding the nominal power coefficient, $C_{P,\,nom}$. Thus, at relatively low wind speeds, the so-called 'partial load' region, the pitch angle is controlled in such a manner that the power coefficient is as high as possible, and at higher wind speeds, the so-called 'full load' region, the pitch angle is controlled in such a manner that the power coefficient is limited to the nominal power coefficient, $C_{P,\,nom}$. To this end theoretical curves are used for calculating the pitch angle to be applied under the given circumstances. Such curves could, e.g., specify the optimal pitch angle as a function of tip speed ratio, $\lambda$, the optimal pitch angle in this context being the pitch angle which provides the highest possible power coefficient, $C_P$. The tip speed ratio, $\lambda$, is the ratio between the blade tip speed and the wind speed.

In some wind regimes, in particular at wind speeds just below the wind speed where the nominal power coefficient, $C_{P,\,nom}$, is reached, there is a risk that the rotor blades stall and the airflow over the blades separates from the blade, if the turbine is operated in accordance with the 'optimal pitch' curves described above, e.g. in the case of turbulence or strong wind shear. Since this is very undesirable, a more precautious control of the pitch angle must be selected, at least in this wind region. Furthermore, the precautious control of the pitch angle is performed in a manner which prevents stalling of the blades as well as excessive loads on various components of the wind turbine, even in a 'worst case scenario'. As a consequence, the wind turbine is operated in a sub-optimal manner, and the power production of the wind turbine is reduced as compared to a theoretical maximum power production.

In Zhang, X., et al., "Intelligent control for large-scale variable speed variable pitch wind turbines", Journal of Control Theory and Applications 3 (2004) 305-311, a method for operating a wind turbine is disclosed. The proposed control system consists of two loops: An inner loop for generator torque regulation using adaptive fuzzy control based on variable universe to maximise the capture of power at below-rated wind speed; an outer rotor loop to control pitch angle and keep rated power using least square support vector machine (LS-SVM) control. The rotor loop controller input variables are the generator output power, the shaft rotational speed, $\omega$, and the estimated effective wind speed, $V_w$. The output control variable is the reference pitch angle, $\beta_{ref}$, of the rotor blades.

DESCRIPTION OF THE INVENTION

It is an object of embodiments of the invention to provide a method for operating a wind turbine in which the annual energy production is increased as compared to prior art operating methods, without increasing the risk of the blades stalling.

It is a further object of embodiments of the invention to provide a method for operating a wind turbine in which the annual energy production is increased as compared to prior art operating methods, without increasing the risk of overload on one or more components of the wind turbine.

According to the invention there is provided a method for operating a wind turbine, the wind turbine comprising a rotor having a set of wind turbine blades, said rotor being mounted on a tower, the method comprising the steps of:

providing a curve defining optimal pitch angle as a function of tip speed ratio for the wind turbine blades or as a function of wind speed, modifying at least a part of said optimal pitch angle curve by applying a safety buffer, thereby obtaining a safety modified pitch angle curve, operating the wind turbine in accordance with the safety modified pitch angle curve, measuring one or more parameters providing information regarding wind conditions and/or loads on one or more components of the wind turbine, during operation of the wind turbine, adjusting the safety buffer, based on said measurements, thereby obtaining an adjusted pitch angle curve, and operating the wind turbine in accordance with the adjusted pitch angle curve.

According to the present invention, a curve defining optimal pitch angle is initially provided. The curve may be 'optimal' in the sense that it defines the pitch angle which, under the given circumstances, e.g. wind conditions, provides the highest possible power output or power coefficient, $C_P$, for the wind turbine. Alternatively or additionally, the curve may be optimal with respect to other factors or conditions, such as wind direction and/or turbulence. For instance, at some sites it may be known that higher turbulence is present when the wind comes from one direction than when it comes from an opposite direction. In this case, various curves may be selected, depending on a measurement of the wind direction.

In the present context the term 'pitch' should be interpreted to mean rotation of a wind turbine blade about an axis extending along a longitudinal direction of the wind turbine blade.

The curve defines the optimal pitch angle as a function of tip speed ratio for the wind turbine blades or as a function of wind speed. Accordingly, the curve may advantageously be an 'optimal pitch' curve as described above.

The curve may be selected on the basis of site specific data, such as height of the position of the wind turbine, climate, prevailing wind direction, average wind wake conditions, average turbulence conditions, etc.

Next, at least part of the optimal pitch angle curve is modified by applying a safety buffer. The safety buffer is applied in order to prevent blade stall, and/or that one or more components of the wind turbine are overloaded, in the case of gusts or strong wind shear. The safety buffer is normally designed in such a manner that even a 'worst case scenario' can be handled. As described above, the safety buffer therefore will cause the wind turbine to operate in a suboptimal manner, at least in some tip speed ratio or wind speed regions. A safety modified pitch angle curve is thereby obtained.

The entire optimal pitch angle curve may be modified, or only a part of the curve may be modified. In the case that only a part of the curve is modified, the safety buffer may only be applied at tip speed ratios and/or pitch angles where it is known that there is a high risk of the blades stalling and/or that overload is caused to the wind turbine.

The wind turbine is then operated in accordance with the safety modified pitch angle curve. Thereby the risk of the blades stalling and/or of overload on the wind turbine is eliminated or at least reduced considerably. However, as mentioned above, it must be expected that the wind turbine is operated in a suboptimal manner, i.e. the energy production may be lower than the maximum possible energy production.

While operating the wind turbine in accordance with the safety modified pitch angle curve, one or more parameters providing information regarding wind conditions and/or loads on one or more components of the wind turbine are measured. The parameter(s) may, e.g., include parameters relating to loads, such as fatigue loads, on blades, bearings and/or tower construction, wind speed, wind shear, turbulence, wind direction, etc.

The parameter(s) may be measured directly. However, as an alternative, one or more parameters may be measured indirectly in the sense that they are estimated or calculated from measurements of one or more parameters which do not directly provide information regarding wind conditions and/or loads. For instance, loads on the tower construction may be estimated or calculated on the basis of measurements of amplitude and/or frequency of measured tower oscillations.

Based on the measured parameters the safety buffer is adjusted. Thereby an adjusted pitch angle curve is obtained. Finally, the wind turbine is operated in accordance with the adjusted pitch angle curve.

The measured parameters represent actual conditions at and/or in the wind turbine. Since the safety buffer is adjusted on the basis of the measured parameters, these actual conditions are taken into account when the final safety buffer is defined. Thus, if the measured parameters indicate that a 'worst case scenario' is not eminent, the safety buffer can be reduced, thereby allowing the wind turbine to be operated closer to the optimal pitch curve, thereby obtaining a power coefficient, $C_P$, which is closer to the maximum power coefficient, $C_{P,\,max}$, and increasing the energy production of the wind turbine. On the other hand, in the case that the measured parameters indicate that there is a very high risk of the blades stalling and/or of excessive loads on one or more components of the wind turbine, the safety buffer may be maintained, or even increased, thereby ensuring that blade stall as well as excessive loads are avoided. Thus, the safety buffer is dynamically updated based on the actual operating conditions.

Accordingly, the step of adjusting the safety buffer allows the wind turbine to be operated as close to the maximum power coefficient, $C_{P,\,max}$, as the actual conditions allow. Thereby the power production of the wind turbine, and thereby the annual energy production, AEP, is increased.

It should be noted that the step of adjusting the safety buffer could be performed by actually changing the safety buffer and calculating or generating a new pitch curve. However, in practice a number of pre-generated pitch curves may be available, and the step of adjusting the safety buffer may simply be performed by selecting another one of the pre-generated curves, which is more suitable under the given circumstances indicated by the measured parameters.

The step of adjusting the safety buffer may comprise:
calculating an estimated power coefficient, $C_{P,\,Est}$,
comparing the estimated power coefficient, $C_{P,\,Est}$, to a reference power coefficient, $C_{P,\,Ref}$, and
adjusting the safety buffer based on the comparing step.

According to this embodiment, the measured parameters are used for calculating an estimated power coefficient, $C_{P,\,Est}$. Thereby a measure for the actual power being produced by the wind turbine is obtained. The estimated power coefficient, $C_{P,\,Est}$, is then compared to a reference power coefficient, $C_{P,\,Ref}$. The reference power coefficient, $C_{P,\,Ref}$, may advantageously be an optimal power coefficient, $C_{P,\,opt}$, in which case it may be obtained by measuring the tip speed ratio of the wind turbine and consulting an optimal $C_P$ curve. The comparison may, e.g., result in an error signal indicating how close the actual power coefficient is to the reference power coefficient. Finally, the safety buffer is adjusted based on the comparing step.

The step of adjusting the safety buffer based on the comparing step may be performed in a manner which is expected to decrease the difference between the estimated power coefficient, $C_{P,\,Est}$, and the reference power coefficient, $C_{P,\,Ref}$. According to this embodiment, the adjustment of the safety buffer brings the actual power coefficient closer to the reference value.

Alternatively or additionally, the step of adjusting the safety buffer based on the comparing step may comprise reducing the safety buffer in the case that the estimated power coefficient, $C_{P,\,Est}$, is smaller than the reference power coefficient, $C_{P,\,Ref}$. In the case that the estimated power coefficient, $C_{P,\,Est}$, is smaller than the reference power coefficient, $C_{P,\,Ref}$, it is an indication that the actual operating conditions allow the wind turbine to be operated in a more aggressive manner than it is currently being operated. It is therefore possible to reduce the safety buffer, thereby selecting a more aggressive operating strategy and increasing the power production, without risking that the blades stall and/or that the wind turbine, or one or more components of the wind turbine, is overloaded.

The step of measuring one or more parameters may comprise measuring an amplitude of an individual and/or cyclic pitch control of the wind turbine blades, and the step of adjusting the safety buffer may be performed on the basis of said measured amplitude. The pitch angles of the wind turbine blades may sometimes be controlled in an individual and/or cyclic manner. This may, e.g., be in order to take into account that the wind conditions experienced by a blade varies depending on the angular position of the blade as it rotates along with the rotor. Such variations are, e.g., due to wind shear and tower passage. When such cyclic adjustments to the pitch angles are used when controlling operation of a wind turbine, a relatively large safety margin on the pitch regulation is normally required in order to prevent blade stall and/or that the wind turbine is overloaded. Accordingly, the contribution to the safety buffer which can be accounted to the cyclic adjustment process may constitute a relatively large fraction of the total safety buffer. It is therefore very relevant to investigate how large the amplitude of the cyclic variations of the pitch angles is in reality, and to adjust the safety buffer in accordance with this investigation. Thus, if it turns out that the amplitude of the cyclic variations is much smaller than a 'worst case scenario', the safety buffer can safely be reduced.

The step of adjusting the safety buffer may comprise the steps of comparing the measured amplitude to a maximum allowable amplitude and reducing the safety buffer in the case that the measured amplitude is smaller than the maximum allowable amplitude. According to this embodiment, the maximum allowable amplitude may advantageously be an amplitude which is expected under the worst possible conditions. In this case the safety buffer is, according to this embodiment, reduced if it is established that the actual operating conditions are less severe than the 'worst case scenario'. As an alternative, the maximum allowable amplitude may be an amplitude which is expected under conditions which have been assumed when the optimal pitch curve was selected and the safety buffer applied. If it turns out that the actual amplitude is smaller than this, it indicates that the actual conditions are less severe than expected, and the safety buffer can be reduced accordingly.

The step of adjusting the safety buffer may comprise:
estimating a load on one or more wind turbine components based on one or more of the measured parameters, and maintaining or increasing the safety buffer in the case that the estimated load exceeds a predefined threshold value.

According to this embodiment, at least some of the measured parameters are used for estimating a load on one or more wind turbine components. If it turns out that the estimated load is larger than expected and/or that there is a risk of overload on one or more wind turbine components, it is not safe to reduce the safety buffer. Therefore the original safety buffer is maintained, or the safety buffer may even be increased.

The step of estimating a load may, e.g., comprise estimating a blade fatigue level. As an alternative, loads on tower, bearings, drive train, etc. may be estimated.

As an alternative to loads, other parameters may be measured or estimated and used as a basis for determining whether to increase, maintain or decrease the safety buffer. For instance, a decrease or increase in power and/or in estimated power coefficient, $C_P$, may be detected, and the safety buffer may be reduced or increased in accordance herewith. Or one or more parameters indicating a sudden stall of the blades may be measured, and the safety buffer may be increased accordingly.

BRIEF DESCRIPTION OF THE DRAWINGS

The invention will now be described in further detail with reference to the accompanying drawings in which.

DETAILED DESCRIPTION OF THE DRAWINGS

Figure 1:
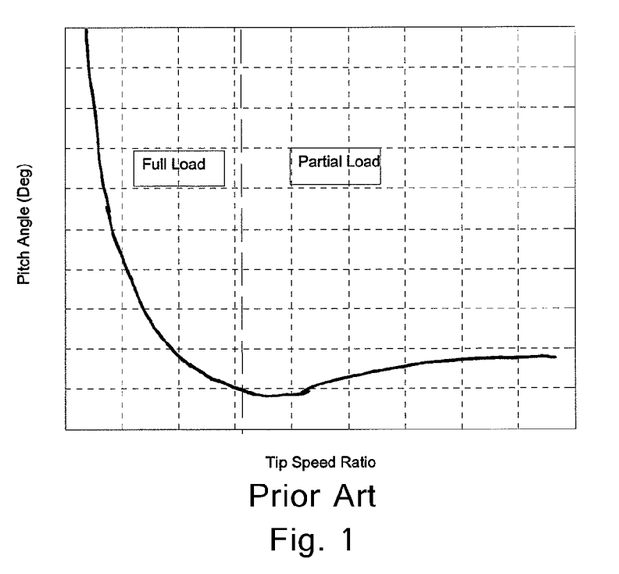
FIG. 1 is a graph showing optimal pitch angle as a function of tip speed ratio, $\lambda$.

FIG. 1 is a graph showing a pitch angle of a wind turbine rotor blade as a function of tip speed ratio, $\lambda = R\omega/v_w$, where R is the rotor radius of the wind turbine, $\omega$ is the rotational speed of the rotor of the wind turbine and $v_w$ is the wind speed. The curve shown in FIG. 1 is theoretically determined in such a manner that for a given tip speed ratio, $\lambda$, the pitch angle which optimises the power coefficient, $C_P$, is selected. Thus, the curve is generated in a manner which takes only maximisation of the power production into consideration. Thus, other relevant parameters, such as loads, risk of stall, etc., have not been taken into consideration when generating the curve. Accordingly, if the pitch angle is always controlled along the curve shown in FIG. 1, the rotor power coefficient, $C_P$, will be optimal, resulting in optimal power production of the wind turbine.

At low wind speeds, i.e. at high tip speed ratio, the pitch angle is controlled in order to maximise the rotor power coefficient, $C_P$. This region is sometimes referred to as the 'partial load region'. When the nominal power coefficient, $C_{P\ nom}$, is reached at higher wind speeds (lower tip speed ratio), the pitch angle is controlled in order to restrict the power coefficient, $C_P$, to the nominal power coefficient, $C_{P\ nom}$. This region is sometimes referred to as the 'full load region'. It is clear from FIG. 1 that the pitch angle is generally significantly larger in the full load region than in the partial load region.

At wind speeds in the region where the nominal power coefficient, $C_{P\ nom}$, is reached, the optimum pitch angle is very low. The low pitch angles in this region increases the risk that the wind turbine blade stall if high turbulence is present. Furthermore, there is a risk that excessive loads are applied to some wind turbine components, such as blades, bearings, drive train and/or tower in the case of high turbulence or wind shear. Such excessive loads may reduce the expected lifetime of the wind turbine or of one or more components of the wind turbine. In order to prevent stalling of the blades, and in order to avoid excessive loads on components of the wind turbine, the pitch angle is normally not controlled in accordance with the optimum pitch curve shown in FIG. 1, but rather in accordance with a modified curve in which a 'buffer zone' is added, at least in the region where the nominal power coefficient, $C_{P\ nom}$, is reached. Thereby a pitch angle which is larger than the optimal pitch angle is selected, at least in said region, and the wind turbine is therefore operated in a suboptimal manner.

Figure 2:
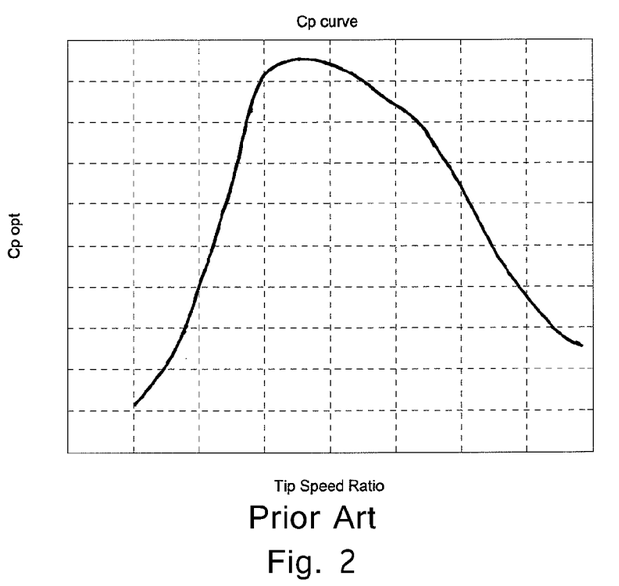
FIG. 2 is a graph showing optimal power coefficient, $C_{P, opt}$, as a function of tip speed ratio, $\lambda$.

FIG. 2 is a graph showing optimal power coefficient, $C_{P, opt}$, as a function of tip speed ratio, $\lambda$. The curve shown in FIG. 2 illustrates the maximum obtainable power coefficient, $C_P$, for a given tip speed ratio, $\lambda$. The curve of FIG. 2 is obtained if the pitch angle of the wind turbine is operated in accordance with the curve shown in FIG. 1.

As described above, the pitch angle is normally not operated precisely in accordance with the curve shown in FIG. 1 for safety reasons. Instead a buffer zone or safety margin is added, at least in the region where the nominal power coefficient, $C_{P\ nom}$, is reached, the buffer zone or safety margin causing the applied pitch angle to be larger than the optimum pitch angle, thereby decreasing the power output of the wind turbine. The buffer zone or safety margin is selected in such a manner that there is no risk that the blades stall or that the components of the wind turbine experience excessive loads, even if the worst possible conditions, in terms of turbulence, gusts and/or wind shear, should occur. This has the consequence that the wind turbine is for most of the time operated in a suboptimal manner without any real danger of the blades stalling or the lifetime of the wind turbine being affected, because the worst possible conditions only occur very rarely. However, for safety reasons it must be ensured that when the worst possible conditions occur, the blades will not stall.

According to the present invention the actual wind conditions are examined and evaluated, and in the case that it is revealed that the severity of the actual wind conditions is far from the worst possible conditions, then the safety criteria are loosened, the buffer zone or safety margin is reduced, and the pitch angle is controlled to be closer to the optimal pitch curve shown in FIG. 1. If, on the other hand, it is revealed that the severity of the actual wind conditions is close to the worst possible conditions, then the original buffer zone or safety margin is maintained. Furthermore, in the case that it is revealed that the severity of the actual wind conditions is worse than expected and accounted for in the buffer zone or safety margin, then the buffer zone or safety margin may be increased, thereby reducing the risk of blade stall or that excessive loads are applied to the components of the wind turbine.

Figure 3:
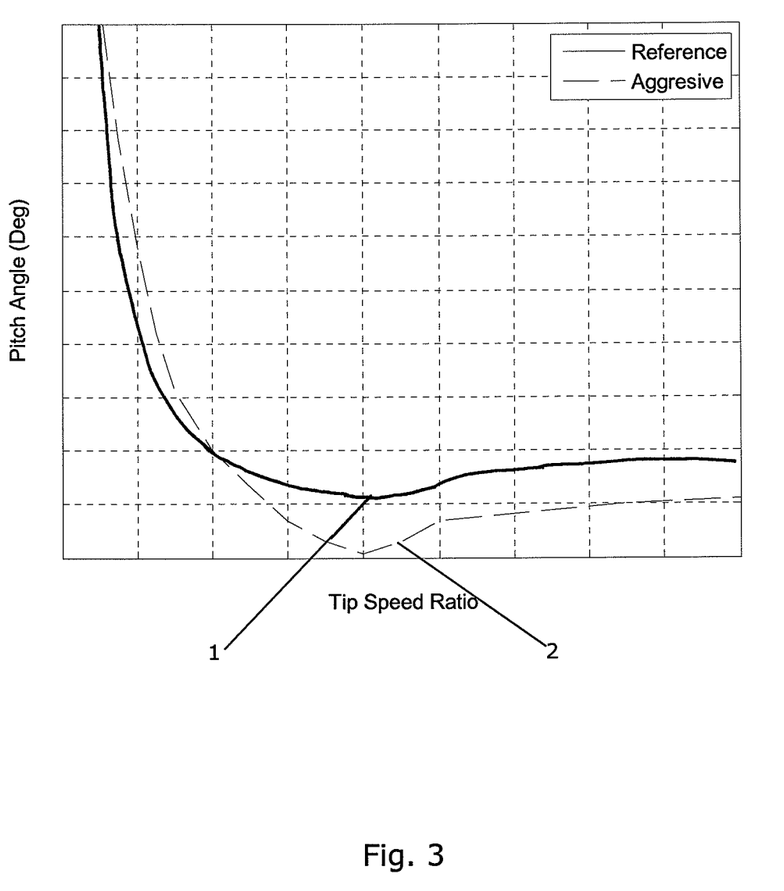
FIG. 3 is a graph comparing optimal pitch angle as a function of tip speed ratio, $\lambda$, during operation of a wind turbine in accordance with a prior art control strategy and a control strategy according to an embodiment of the invention, respectively.

FIG. 3 is a graph showing pitch angle as a function of tip speed ratio, λ, similar to FIG. 1. In FIG. 3 two curves are shown. The full line 1 illustrates a reference curve, i.e. an optimal pitch curve including a full buffer zone or safety margin as described above. Thus, the full line 1 represents a prior art control strategy. The dashed line 2 represents a more aggressive control strategy, where the buffer zone or safety margin is decreased in the case that it is revealed that the severity of the actual wind conditions is far from the worst possible conditions. Thus, the dashed line 2 represents a control strategy according to an embodiment of the invention.

It is clear from FIG. 3 that the control strategy according to an embodiment of the invention allows a smaller pitch angle to be selected in the region where the nominal power coefficient, $C_{P\ nom}$, is reached, than is the case if the pitch angle is controlled in accordance with the reference curve 1.

Figure 4:
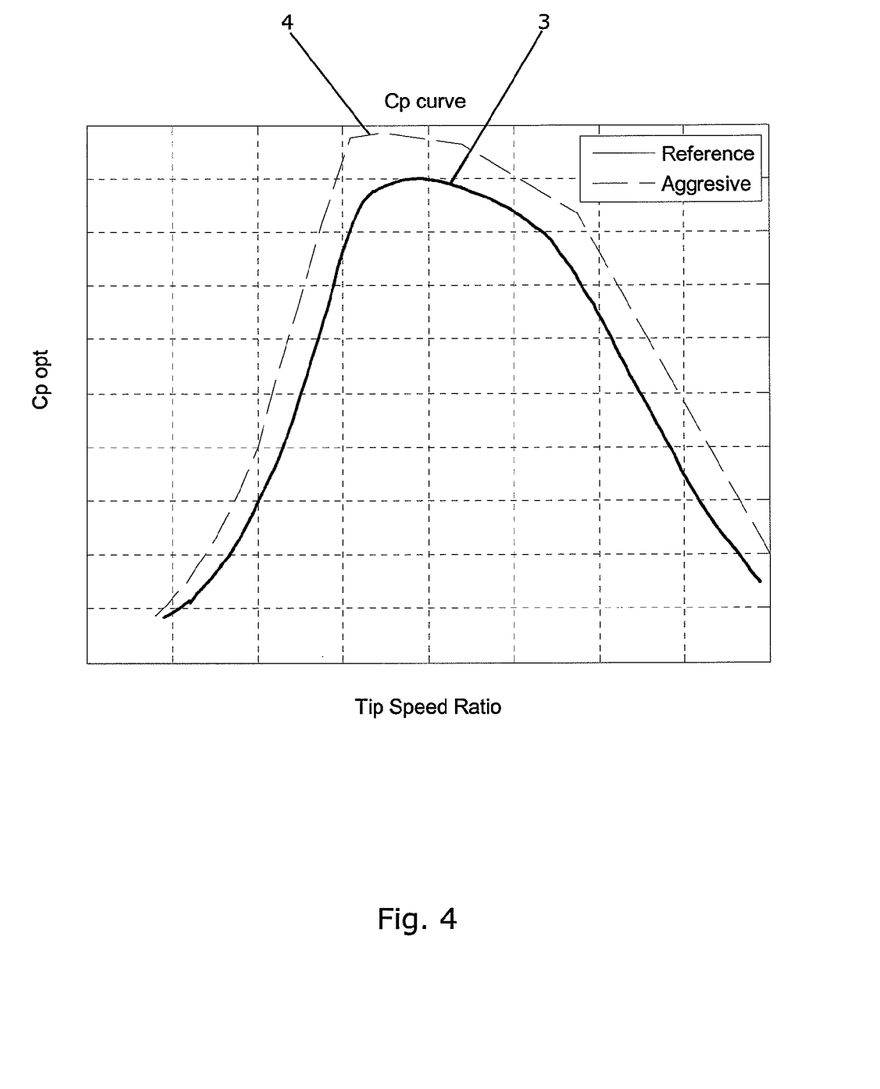
FIG. 4 is a graph comparing optimal power coefficient, $C_{P, opt}$, as a function of tip speed ratio, $\lambda$, during operation of a wind turbine in accordance with a prior art control strategy and a control strategy according to an embodiment of the invention, respectively.

FIG. 4 is a graph showing rotor power coefficient, $C_P$, as a function of tip speed ratio, λ, similar to FIG. 2. In FIG. 4 two curves are shown. The full line 3 represents the power coefficient, $C_P$, obtained when the pitch angle is controlled in accordance with the reference control strategy illustrated by curve 1 of FIG. 3, and the dashed line 4 represents the power coefficient, $C_P$, obtained when the pitch angle is controlled in accordance with the control strategy of the invention illustrated by curve 2 of FIG. 3. It is clear from FIG. 4 that the aggressive control strategy 4 results in a significantly higher power coefficient, $C_P$, than the reference control strategy 3, over a wide range of tip speed ratios, λ. As a result, a significant increase in the annual energy production of the wind turbine is obtained, without increasing the risk that the wind turbine blades stall or that excessive loads are applied to the components of the wind turbine.

Figure 5:
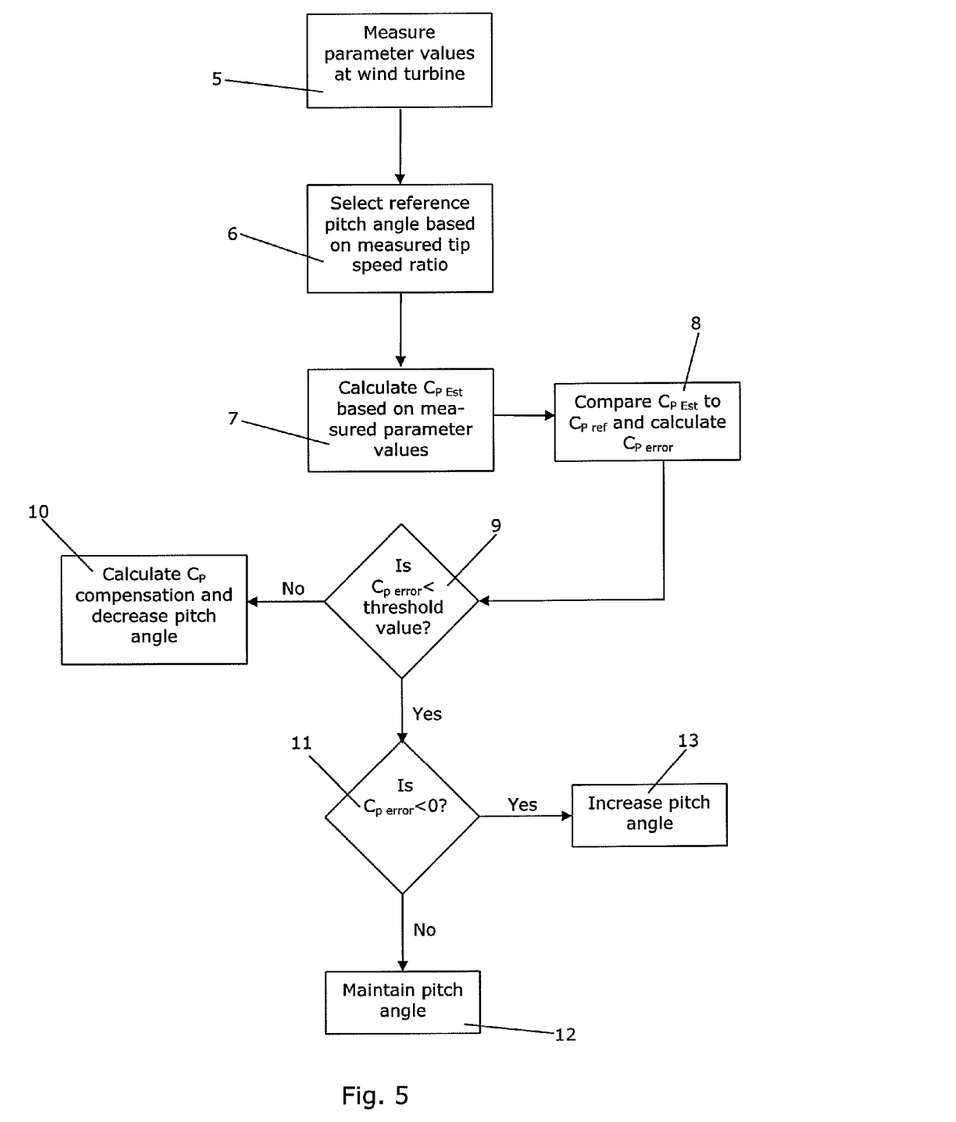
FIG. 5 is a flow diagram illustrating a method according to an embodiment of the invention.

FIG. 5 is a flow diagram illustrating a method according to an embodiment of the invention. In step 5 a number of parameter values are measured. The parameter values may, e.g., include tip speed ratio, output power, pitch angle, yaw error, wind speed, rotational speed of the generator, temperature and height of the location of the wind turbine. The parameter values may be measured directly. As an alternative, one or more of the parameter values may be estimated or calculated from measured values. For instance, loads or turbulence may be estimated on the basis of measured parameters, and the estimated loads or turbulence may be used when adjusting the pitch angle. Thus, measured and/or estimated parameters may be used for calculating and/or estimating quantities which are required for pitch angle adjustment, e.g. $C_P$, loads, turbulence, etc.

Based on the measured tip speed ratio, a reference pitch angle can be selected at step 6. The reference pitch angle is selected by means of a reference pitch curve including a buffer zone or safety margin as described above with reference to FIG. 3.

Some or all of the measured parameter values are supplied to a $C_P$ estimator, and in step 7 an estimated value, $C_{P\ Est}$, of the actual current rotor power coefficient, $C_P$, of the wind turbine is calculated on the basis of the measured parameter values, and possibly on the basis of one or more estimated values. Simultaneously, a reference $C_P$ value is obtained on the basis of the measured tip speed ratio and by means of a maximum $C_P$ reference curve. The reference $C_P$ value, $C_{P\ ref}$, and the estimate $C_P$ value, $C_{P\ est}$, are compared in step 8, thereby obtaining an error signal, $C_{P\ error}$.

In step 9 it is investigated whether $C_{P\ error}$ is smaller than a threshold value. If this not is the case, i.e. if the error signal, $C_{P\ error}$, is large and positive, a $C_P$ compensation is calculated, and the pitch angle is decreased in step 10. Thus, in this case a pitch angle which is smaller than the pitch angle specified by the reference pitch curve is selected. Exactly how much the pitch angle is to be adjusted is carefully calculated, depending on the size of the error signal, $C_{P\ error}$. Furthermore, it should be noted that other considerations may be taken into account when adjusting the pitch angle. For instance, measured, estimated or calculated loads, blade stall, outputs from other controllers, etc. may be incorporated when the pitch adjustment is calculated.

In the case that the investigation of step 9 reveals that $C_{P\ error}$ is smaller than the threshold value, then the process is advanced to step 11, where it is investigated whether $C_{P\ error}$ is smaller than zero. If this is not the case, i.e. in the case that the error signal, $C_{P\ error}$, is equal to or close to zero, the reference pitch angle is maintained as shown in step 12.

In the case that the investigation of step 11 reveals that $C_{P\ error}$ is negative, then the pitch angle is increased in step 13. Thus, in this case, a larger pitch angle than the one specified by the reference pitch curve is selected, since this is an indication that the actual wind conditions are more severe than expected.

The method may further comprise calculating an estimated value of the fatigue on the blades under the given operating conditions. Based on the estimated blade fatigue, a lower limit for the pitch angle may be calculated, the lower limit representing a pitch angle below which it must be expected that excessive loads are applied to the blades. According to one embodiment, the adjustment of the pitch angle described above, based on the error signal, $C_{P\ error}$, is not allowed to decrease the pitch angle below the calculated lower limit.

Furthermore, the pitch angles of the blades may be controlled in an individual and/or cyclic manner in order to reduce the loads on the blades, bearings, drive train, tower, etc., e.g. due to wind shear, gusts or turbulence. This is normally obtained by applying a correction to the pitch angle of each blade, the correction varying cyclically depending on the angular position of the blade. The correction may be calculated on the basis of measured parameter values representing the actual wind conditions at the wind turbine site. The amplitude of the cyclically varying corrections is a measure for the current wind shear. The buffer zone or safety margin applied to the optimal pitch curve may, among other things, be established on the basis of a maximum expected amplitude of the cyclic variations.

The actual amplitude of the cyclic variations may be measured, and this measured amplitude may be compared to the maximum expected amplitude. In the case that the comparison reveals that the actual amplitude is much smaller than the maximum expected amplitude, then the buffer zone or safety margin may be reduced accordingly, thereby allowing a smaller pitch angle and a more aggressive control strategy.

The invention claimed is:

1. A method for operating a wind turbine, the wind turbine comprising a rotor having a set of wind turbine blades, the rotor being mounted on a tower, the method comprising:
    (a) providing a curve defining optimal pitch angle as a function of tip speed ratio for the wind turbine blades or as a function of wind speed,
    (b) selecting a first safety margin such that there is little to no risk that the blades stall or that components of the wind turbine experience excessive loads in expected worst case wind conditions, wherein the expected worst case wind conditions are historical worst case wind conditions in terms of wind speed, wind direction, wind turbulence, wind ousts, and/or wind shear, as measured, estimated, and/or calculated from estimated values, (c) modifying at least a part of the optimal pitch angle curve by applying the first safety margin, thereby obtaining a first safety margin modified pitch angle curve, (d) operating the wind turbine in accordance with the first safety margin modified pitch angle curve, (e) measuring one or more parameters providing information regarding wind conditions and/or loads on one or more components of the wind turbine, during operation of the wind turbine, (f) selecting a second safety margin based on the measurements, (g) modifying at least a part of the optimal pitch angle curve by applying the second safety margin, thereby obtaining a second safety margin modified pitch angle curve, and (h) operating the wind turbine in accordance with the second safety margin modified pitch angle curve, (i) wherein the step of selecting the second safety margin comprises decreasing the second safety margin below the first safety margin in the event that the measurements indicate wind conditions less severe than the expected worst case wind conditions, or increasing the second safety margin above the first safety margin in the event that the measurements indicate wind conditions more severe than the expected worst case wind conditions, and repeating steps (e) through (i) to select and implement third and subsequent safety margins during operation of the wind turbine to produce a continuously variable safety margin based on the difference between measured parameters and expected worst case wind conditions based on a historical frame of reference.

2. The method according to claim 1, wherein the step of selecting the second safety margin comprises:
calculating an estimated power coefficient, $C_{P, Est}$,
comparing the estimated power coefficient, $C_{P,Est}$, to a reference power coefficient, $C_{P, Ref}$, and
adjusting the second safety margin based on the comparing step.

3. The method according to claim 2, wherein the step of selecting the second safety margin based on the comparing step is performed in a manner which is expected to decrease the difference between the estimated power coefficient, $C_{P,Est}$, and the reference power coefficient, $C_{P, Ref}$.

4. The method according to claim 2, wherein the step of selecting the second safety margin based on the comparing step comprises reducing the second safety margin in the case that the estimated power coefficient, $C_{P, Est}$, is smaller than the reference power coefficient, $C_{P, Ref}$.

5. The method according to claim 1, wherein the step of measuring one or more parameters comprises measuring an amplitude of an individual and/or cyclic pitch control of the wind turbine blades, and wherein the step of selecting the second safety margin is performed on the basis of the measured amplitude.

6. The method according to claim 5, wherein the step of selecting the second safety margin comprises the steps of comparing the measured amplitude to a maximum allowable amplitude and reducing the second safety margin in the case that the measured amplitude is smaller than the maximum allowable amplitude.

7. The method according to claim 1, wherein the step of selecting the second safety margin comprises:
estimating a load on one or more wind turbine components based on one or more of the measured parameters, and
maintaining or increasing the second safety margin in the case that the estimated load exceeds a predefined threshold value.

8. The method according to claim 7, wherein the step of estimating a load comprises estimating a blade fatigue level.

* * * * *

UNITED STATES PATENT AND TRADEMARK OFFICE
CERTIFICATE OF CORRECTION

PATENT NO. : 9,261,076 B2
APPLICATION NO. : 13/701259
DATED : February 16, 2016
INVENTOR(S) : Imad Abdallah et al.

Page 1 of 1

It is certified that error appears in the above-identified patent and that said Letters Patent is hereby corrected as shown below:

In the Claims:

At column 9, claim 1, line 1, change "ousts" to --gusts--

Signed and Sealed this
Twenty-third Day of August, 2016

Michelle K. Lee
*Director of the United States Patent and Trademark Office*